L. ROUANET.
DEVICE FOR CARRYING SPARE WHEELS ON MOTOR CARS.
APPLICATION FILED AUG. 4, 1917.

1,357,593.

Patented Nov. 2, 1920.

INVENTOR
Louis Rouanet

L. ROUANET.
DEVICE FOR CARRYING SPARE WHEELS ON MOTOR CARS.
APPLICATION FILED AUG. 4, 1917.

1,357,593.

Patented Nov. 2, 1920.
2 SHEETS—SHEET 2.

INVENTOR;
Louis Rouanet
ATTY

UNITED STATES PATENT OFFICE.

LOUIS ROUANET, OF IVRY-PORT, FRANCE, ASSIGNOR TO COMPAGNIE D'APPLICATIONS MECANIQUES, OF IVRY-PORT, FRANCE.

DEVICE FOR CARRYING SPARE WHEELS ON MOTOR-CARS.

1,357,593.

Specification of Letters Patent.

Patented Nov. 2, 1920.

Application filed August 4, 1917. Serial No. 184,493.

*To all whom it may concern:*

Be it known that I, LOUIS ROUANET, citizen of the Republic of France, residing at 42 Rue Franklin, Ivry-Port, Seine, in the Republic of France, have invented new and useful Improvements in Devices for Carrying Spare Wheels on Motor-Cars, of which the following is a specification.

The object of the present invention is a jointed wheel-carrying device combined with a tool box which can be attached for instance upon the foot-board of a vehicle, and such a system allows of carrying out on the spot all the operations required for tire changing upon the extra wheel, such work being carried out in a practical manner owing to the use of a jointed device which carries an extra or false hub having the said extra wheel mounted upon it, and this disposition allows of using a rapid movement in order to bring the wheel into a practically horizontal position, for experience shows that this position is the best one for performing the tire changing operation.

The jointed device is made up of a system of rods or tubes of any suitable section, these being jointed on the one hand upon shafts attached to lugs carried by the tool box, and on the other hand upon a common shaft passing through the false hub, carrying the extra wheel. This jointed system can be made rigid in any position by the use of a clamping handle of any usual kind which is mounted upon one of the joints.

In the normal or inoperative position, the wheel has a vertical position, but in order to bring it into the operative position for removing the tire, the handle is used for unclamping, then the wheel is brought automatically into a nearly horizontal position (the angle being about 15° from the horizontal) by the forward movement of the entire jointed system, the displacement of the system being limited in each sense by two stops.

The accompanying drawing shows an example of a constructional form of this invention.

Figure 1:
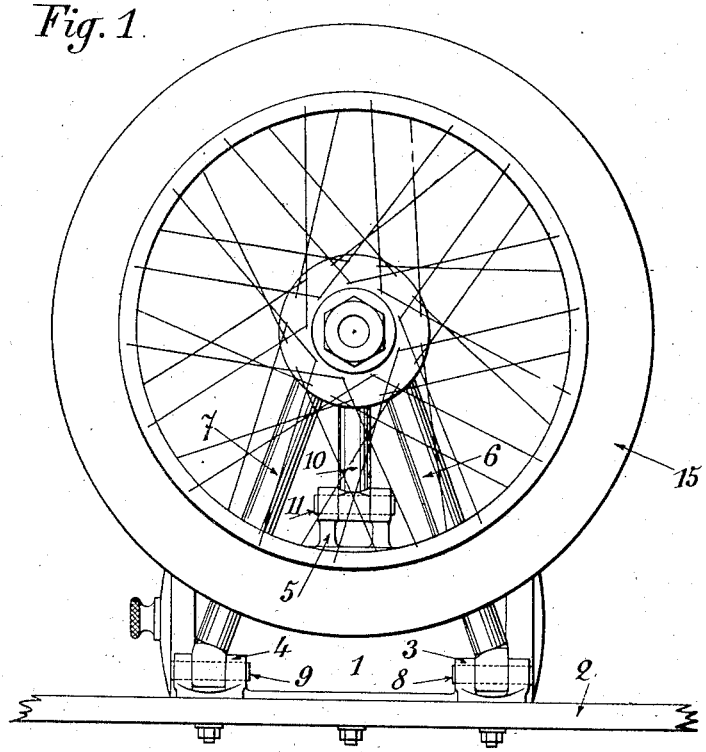
Figure 1 represents the wheel-carrying box with the extra-wheel mounted on the false hub in the normal position.
Figure 2:
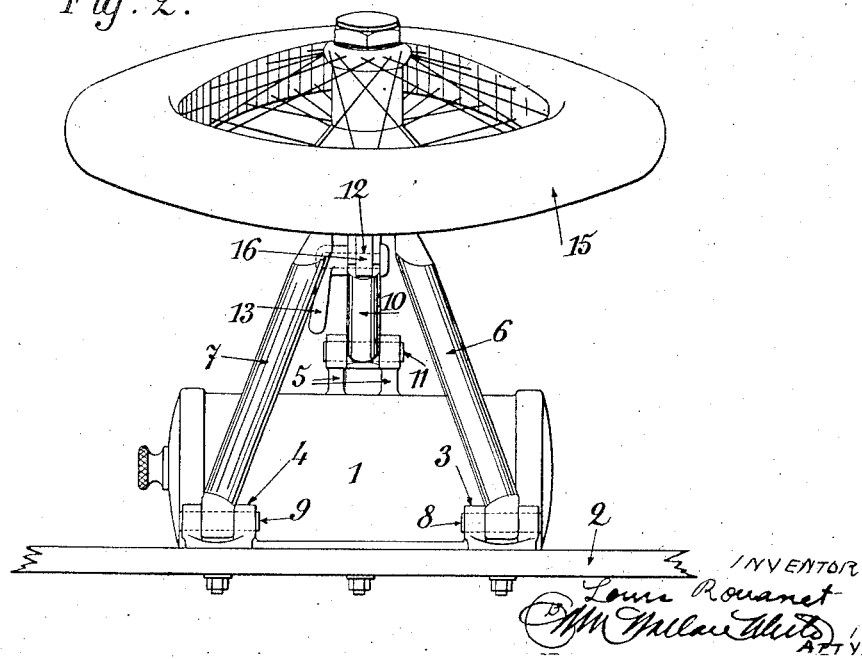
Fig. 2 is a view analogous to Fig. 1, with the jointed system drawn to the front in order to bring the extra-wheel into the position for removing the tire.

The tool box 1 is attached in any suitable manner to the footboard 2 of the vehicle and carries two lugs 3 and 4 (cast with it or separate) at the bottom part of its front side, and another lug 5 is carried on the top of the box at the back of the middle line. Two rods are mounted so that one end of each rod is jointed upon the shafts 8 and 9, these latter being attached to the lugs 3 and 4, while a rod 10 has one end jointed upon a shaft 11 attached to the lug 5. The other end of the rod 10 is jointed upon a bolt 12, the threaded end of which extends into an internally threaded recess in a clamping handle 13.

The false hub carrying the extra wheel 15 is screwed or attached in any suitable manner to a bell-crank 16 pivoted upon a shaft 17, and upon this same shaft are also jointed the upper ends of the rods 6 and 7. The other portion of the bell-crank 16 is jointed upon the bolt 12 of the clamping handle 13. The rod 10 is provided with two flat surfaces $10^a$, $10^b$ which may alternatively abut against similar surfaces $16^a$, $16^b$ on the rod 16, whereby the displacement of the jointed system is limited in two opposite directions as explained below.

Figure 3:
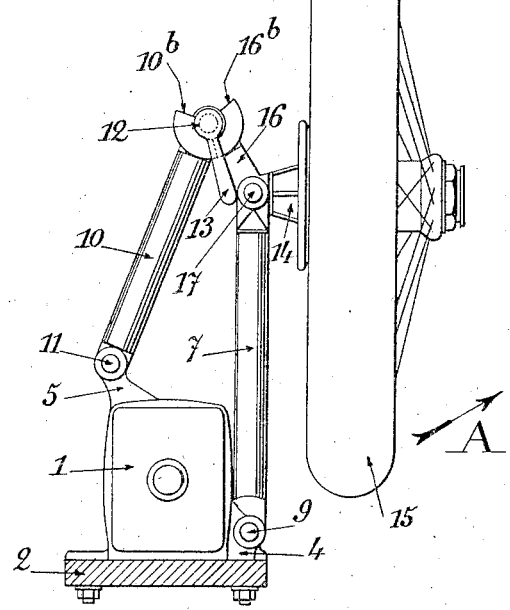
Figs. 3 and 4 show profile views, respectively in the normal position and in the dismounting position.
Figure 4:
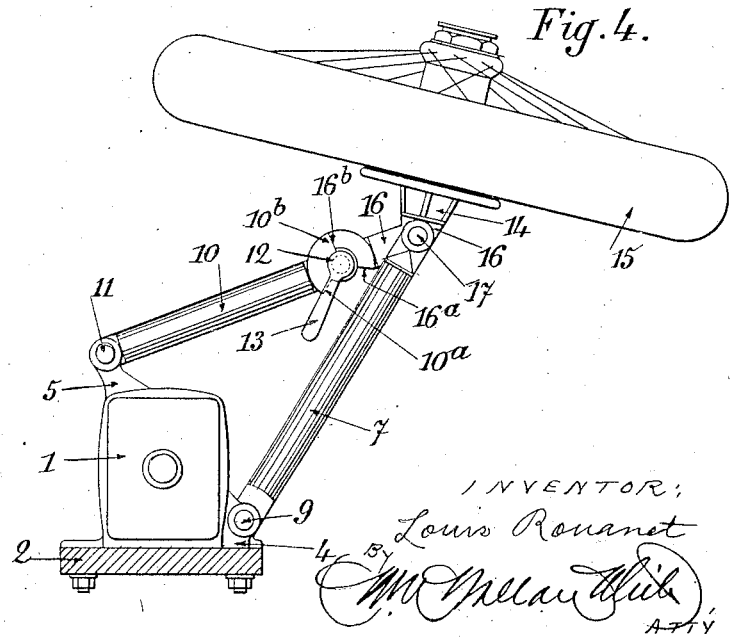

Supposing it is desired to change the tire of the wheel 15 (Fig. 3), the operator takes a position facing the wheel and begins by unclamping with the handle 13, then he places the two hands under the wheel 15. All that is needed is to pull forward in the direction of the arrow, in order to bring the entire jointed system into the position seen in Fig. 4. The portion formed by the rods 6 and 7 moves about the shafts 3 and 4, while the rod 10 moves about the shaft 11. The angular movement of these pieces depends upon their length in combination with the length of the piece 16, and the maximum position depends upon the angle comprised between the sides of the pieces $10^a$ and $10^b$ of the rod 10 on the one hand and $16^a$ and $16^b$ of the rod 16 on the other.

The entire device is clamped by means of a handle 13 in order to bring the jointed system into a rigid position. It is understood that the clamping could also be done when in an intermediate position, but in practice the two end positions can be rapidly attained owing to the contact of the sides 10ª and 16ª for the normal position and the sides 10ᵇ and 16ᵇ for the operative position.

It is of course not essential that the jointed device should be combined with the tool box, and it could be attached directly to any part of the vehicle or even in any other place desired. However the position here indicated has a great advantage, for it allows of utilizing the part of the footboard lying in the rear of the extra wheel. With the usual wheel-carrying devices, this part of the footboard is not utilized and is thus entirely lost for this purpose. In the tool box can be placed all the tools needed for changing the wheel and mounting the same, as well as for tire inflation, and in this way all the tools are within convenient reach.

The triangle formed by the jointed rods when in the wheel-removing position (Fig. 4) gives great rigidity to the system as well as sufficient strength for easily supporting the force exerted upon the wheel when changing the tire. Rigidity in the lateral sense is also obtained by the V-shaped disposition of the rods 6 and 7. When it is desired to use the tool box, all that is needed is to set free the shafts 8, 9 and 11 in order to remove the whole of the jointed system.

Having now described my invention, what I claim as new and desire to secure by Letters Patent is:

1. A device for carrying a spare wheel on motor cars, comprising in combination a supporting member for the spare wheel, one comparatively short connecting rod secured to said supporting member, supporting levers pivotally connected to the connecting rod at two separate points of its length respectively, said supporting levers having a greater length than the connecting rod, fixed pivots about which the supporting levers are hinged, stop surfaces on the connecting rod and corresponding stop surfaces on one of the supporting levers, the coöperative stop surfaces abutting one against the other in the retracted and extended positions of the wheel, respectively.

2. In an automobile, a wheel-carrying device for an extra wheel containing, in combination, two horizontal jointed shafts situated along the same axis and corresponding to the base of an isosceles triangle, and the two extremities of this base; a third jointed shaft parallel to the first and situated at the extremity of the isosceles triangle opposite to the base; means for supporting these three jointed shafts and for rendering them solid with the vehicle; two rods jointed at their lower ends upon the first two jointed shafts; a horizontal jointed shaft connecting these two rods at the top; a rod jointed at its lower end upon the third shaft above mentioned; a horizontal jointed shaft disposed at the top of said rod; a bell-crank connecting the two jointed shafts disposed at the top of the rods; a false hub for holding the extra wheel and attached to said bell-crank; a clamping handle disposed upon one of the two upper jointed shafts; and stop portions provided upon this joint, whose contact serves to limit the movement of the jointed system in two positions, one of which corresponds to the vertical position of the extra wheel and the other to a nearly horizontal position of said wheel, substantially as described and for the purpose set forth.

3. A device for carrying a spare wheel on motor cars, comprising in combination a bell crank lever adapted to support the hub of the spare wheel on one of its arms, supporting levers pivotally connected to the opposite ends of the other arm of said bell crank lever and fixed pivots about which the supporting levers are hinged, the parts being so arranged that by pulling laterally on the wheel, the latter may be brought to an almost horizontal position.

4. A device for carrying a spare wheel on motor cars comprising in combination a bell crank lever adapted to support the hub of the spare wheel on one of its arms, supporting levers pivotally connected to the opposite ends of the other arm of said bell crank lever, a carrier, and pivots removably mounted on said carrier, about which the supporting levers are hinged, the parts being so arranged that by pulling laterally on the wheel, the latter may be brought to an almost horizontal position.

In testimony whereof I have signed my name to this specification in the presence of two subscribing witnesses.

LOUIS ROUANET.

Witnesses:
LOUIS MOSES,
CHAS. P. PRESSLY.